United States Patent
Wojciechowski et al.

(10) Patent No.: US 7,877,536 B2
(45) Date of Patent: Jan. 25, 2011

(54) SCALABLE DISTRIBUTED ROUTING SCHEME FOR PCI EXPRESS SWITCHES

(75) Inventors: Roy D. Wojciechowski, Round Rock, TX (US); Srinadh Madhavapeddi, Dallas, TX (US); Scott Adam Morrison, Richardson, TX (US); Pradip Thaker, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 324 days.

(21) Appl. No.: 11/964,609

(22) Filed: Dec. 26, 2007

(65) Prior Publication Data

US 2009/0172237 A1 Jul. 2, 2009

(51) Int. Cl.
*H05K 7/10* (2006.01)
*G06F 13/14* (2006.01)
*G06F 13/00* (2006.01)

(52) U.S. Cl. .................... 710/301; 710/305; 710/316
(58) Field of Classification Search ............. 710/301, 710/305, 316
See application file for complete search history.

(56) References Cited

U.S. PATENT DOCUMENTS 5,787,095 A * 7/1998 Myers et al. ............... 714/820
7,058,738 B2 * 6/2006 Stufflebeam, Jr. ........... 710/104

* cited by examiner

*Primary Examiner*—Mark Rinehart
*Assistant Examiner*—Jeremy S Cerullo
(74) *Attorney, Agent, or Firm*—William B. Kempter; Wade J. Brady, III; Frederick J. Telecky, Jr.

(57) ABSTRACT

A Peripheral Component Interconnect (PCI) Express switch is provided. The PCI Express switch includes a first routing information bus connected to the first port; a second routing information bus connected to the second port; a third routing information bus connected to the third port; two routing slaves in the first port, each dedicated to listening to one of the second and the third routing information buses; two routing slaves in the second port, each dedicated to listening to one of the first and the third routing information buses; and two routing slaves in the third port, each dedicated to listening to one of the first and the second routing information buses.

20 Claims, 5 Drawing Sheets

SCALABLE DISTRIBUTED ROUTING SCHEME FOR PCI EXPRESS SWITCHES

TECHNICAL FIELD

The present application relates generally to computing devices, and more particularly to Peripheral Component Interconnect (PCI) express switches with distributed routing schemes.

BACKGROUND

During the early 1990s, Peripheral Component Interconnect (PCI) standards were introduced. PCI provided direct access to the system memory for connected devices, by using bridges to connect to front-side buses and to CPU. PCIs can connect multiple components. A PCI bridge chip may regulate the speed of a PCI bus independent from the CPU's speed to enable a higher degree of reliability, and to ensure that PCI hardware manufacturers have consistent design constraints. PCI supports Plug-and-Play, which enables a device or card to be inserted into a computer and automatically recognized and configured to work with that system.

Today's software applications are more demanding in the performance of platform hardware, particularly the I/O subsystems. Streaming data from various video and audio sources are now commonplace on the desktop and mobile machines. Applications such as video-on-demand and audio redistribution are putting increasingly stricter real-time constraints on servers. As a result, existing PCI architecture can no longer cope with these demands, and a new standard called PCI Express has been proposed.

Because the PCI Express standard is derived from and is backward compatible with PCI, the logical buses, devices, and functions within a PCI Express switch need to be compatible with PCI hierarchical guidelines. Conceptually, a PCI Express switch is a mix of PCI-to-PCI (P2P) bridges and internal endpoints, wherein each P2P bridge or internal endpoint represents a single logical PCI function, and each PCI Express port represents a logical P2P bridge.

Typically, since a PCI Express switch (sometimes referred to as PCIe switch) will include multiple PCI bridges, the switching logic of the PCI Express switch needs to know all the information regarding the ports in the PCI Express switch. This brings several possible problems. First, since data packets may come into a PCI Express switch from different ports simultaneously, the processing of one packet may be blocked by the processing of another packet coming in from a different port. This adversely affects the performance of the PCI Express switch. Second, since the routers in the PCI Express switch need to have knowledge of all of the ports, when a port is added or removed (in a new product), or if the configuration/topology of the switch is changed over the previous switch products, the routers need to be re-designed every time a new PCI Express switch product is desired. The intellectual property (IP) of the functional blocks, such as the routers in the PCI Express switches, thus have low reusability. Accordingly, new PCI Express switches having improved routing performance and increased IP reusability are needed.

SUMMARY OF THE INVENTION

These and other problems are generally solved or circumvented, and technical advantages are generally achieved, by embodiments of the present application that provide implementations of Peripheral Component Interconnect (PCI) Express switches.

In accordance with one aspect of the present invention, a PCI Express switch includes a first routing information bus connected to the first port; a second routing information bus connected to the second port; a third routing information bus connected to the third port; two routing slaves in the first port, each dedicated to listening to one of the second and the third routing information buses; two routing slaves in the second port, each dedicated to listening to one of the first and the third routing information buses; and two routing slaves in the third port, each dedicated to listening to one of the first and the second routing information buses.

In accordance with another aspect of the present invention, a PCI Express switch includes an upstream port; a plurality of downstream ports; a plurality of routing blocks, each in one of the upstream port and the plurality of downstream ports; a plurality of routing information buses, each connected to one of the upstream port and the plurality of downstream ports; a plurality of routing slaves in each of the plurality of the routing blocks, wherein each of the plurality of routing information buses is connected to a routing slave in each of the routing blocks; a plurality of "Claimed" daisy chains, each dedicated for propagating and coordinating "Claimed" assertions in response to a routing information received from one of the plurality of routing information buses; a plurality of "Malformed" daisy chains, each dedicated for propagating and coordinating "Malformed" assertions in response to the routing information received from one of the plurality of routing information buses; and a plurality of "Unsupported" daisy chains, each dedicated for propagating and coordinating "Unsupported" assertions in response to the routing information received from one of the plurality of routing information buses.

In accordance with yet another aspect of the present invention, a method for operating a PCI Express switch includes providing a first, a second, and a third port; providing a first daisy chain connecting the first, the second, and the third ports; providing a first, a second, and a third routing information bus connecting to, and dedicated to, the first, the second, and the third ports, respectively; providing a first, a second, and a third routing slave in the first, the second, and the third ports, respectively, wherein the second and the third routing slaves are dedicated to listening to the first routing information bus; receiving a first data packet into the first port; extracting a first routing information from the first data packet; broadcasting the first routing information on the first routing information bus; receiving the first routing information into the second and the third routing slaves; and making first routing assertions regarding the first data packet by the second and the third ports, wherein the first routing assertions are propagated and coordinated through the first daisy chain.

An advantageous feature of the embodiments of the present application is that the design reusability is increased. The design of new PCI Express switch products may copy the routing slaves from the existing design of PCI Express switch products, and design new routing blocks by adding and deleting the routing slaves. In addition, by using the distributed routing scheme of the embodiments of the present application, the routing of incoming data packets can be processed in parallel, and non-blocking routing may be achieved.

The foregoing has outlined rather broadly the features and technical advantages of the present application in order that the detailed description of the present application that follows may be better understood. Additional features and advantages of the embodiments will be described hereinafter which form the subject of the claims of the present application. It should be appreciated by those skilled in the art that the conception and specific embodiments disclosed may be readily utilized as a basis for modifying or designing other structures or processes for carrying out the same purposes of the present application. It should also be realized by those skilled in the art that such equivalent constructions do not depart from the spirit and scope of the present application as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present application provides many applicable inventive concepts that can be embodied in a wide variety of specific contexts. The specific embodiments discussed are merely illustrative of specific examples, and do not limit the scope of the present application.

Figure 1:
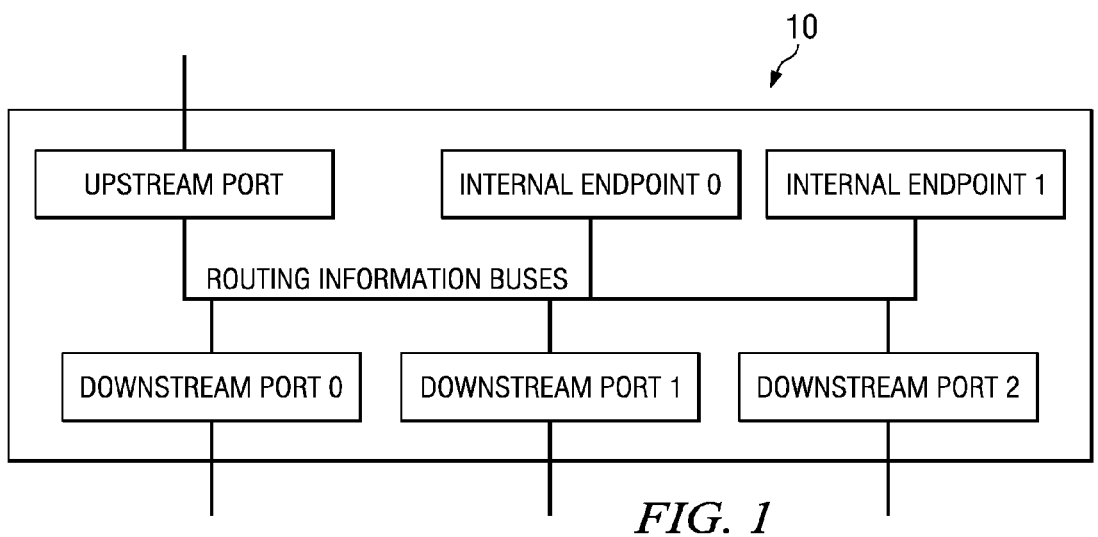
FIG. 1 illustrates a block diagram showing exemplary ports in a Peripheral Component Interconnect (PCI) Express switch embodiment with multifunction endpoints.

FIG. 1 illustrates a block diagram of exemplary ports in Peripheral Component Interconnect (PCI) Express switch 10. In the illustrated exemplary embodiment, PCI Express switch 10 includes a plurality of ports, including an upstream port, and three downstream ports, namely downstream port 0, downstream port 1, and downstream port 2. Although PCI Express switches often have only upstream and downstream ports, in the embodiments of the present application, a PCI Express switch may also include internal endpoints. In the exemplary embodiment shown in FIG. 1, PCI Express switch 10 further includes two internal endpoints, namely internal endpoint 0 and internal endpoint 1. It is appreciated that the number of downstream ports and the number of internal endpoints may be different from what is shown in FIG. 1. The endpoints 0 and 1 are where PCI buses end, and are points at which peripherals such as universal serial buses (USB), firewires, hard disk controllers, and keyboard controllers are connected to PCI Express switch 10.

PCI Express switch 10 is configured to route data packets between the above-discussed ports. For example, a data packet coming into the upstream port may be routed to, and exit any of the downstream ports 0 through 2 and internal endpoints 0 and 1. A data packet coming into one of the downstream ports 0 through 2 may exit out of another downstream port or the upstream port. A data packet coming into one of the endpoints 0 and 1 may exit out of the upstream port. Throughout the description, the data packets are alternatively referred to as incoming transaction layer packets (TLP).

PCI Express switch 10 includes a plurality of routing information buses connecting the upstream port, the downstream ports 0 through 2 and internal endpoints 0 and 1. The number and the connection scheme of the routing information buses are discussed in detail in the subsequent paragraphs. The preferred number of the routing information buses is related to the number of ports in PCI Express switch 10, and each of the ports preferably corresponds to one routing information bus.

Figure 2A:
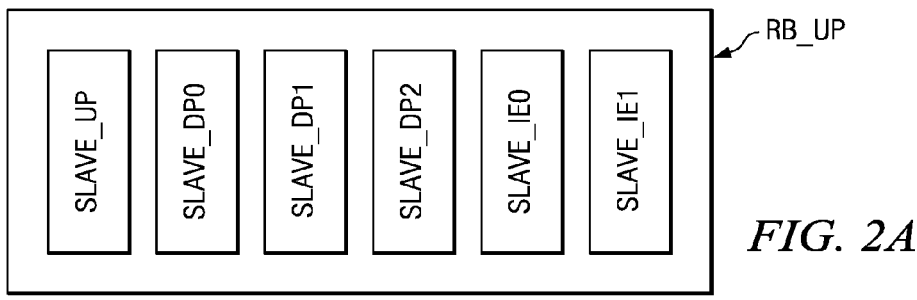
FIGS. 2A, 2B, and 2C illustrate exemplary routing slaves in the routing blocks of an upstream port, a downstream port, and an internal endpoint, respectively.
Figure 2B:
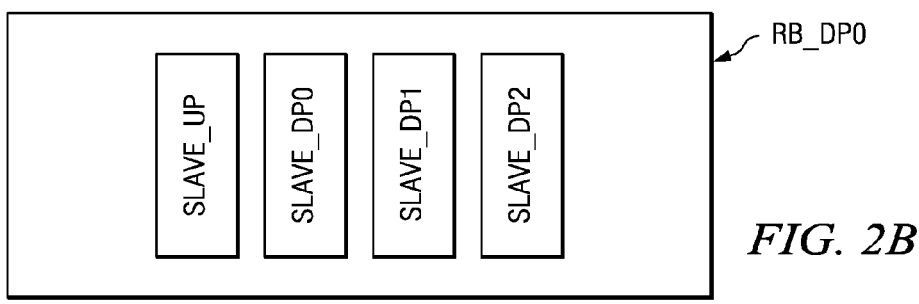
Figure 2C:
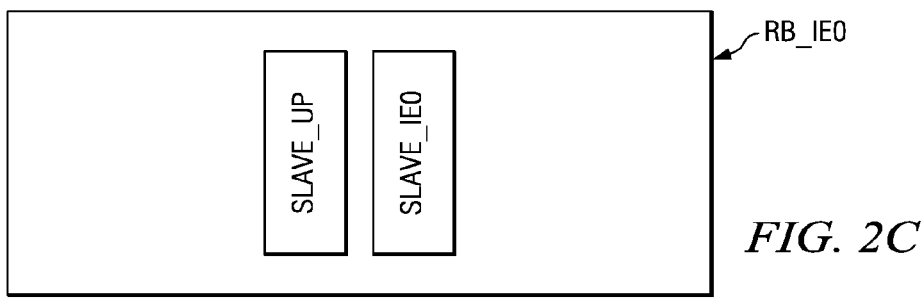

In the preferred embodiment, PCI Express switch 10 adopts a distributed routing scheme, with each of the ports taking a part in the routing of TLPs. Accordingly, each of the ports includes a routing block for performing the routing-related tasks. The exemplary routing blocks are illustrated in FIGS. 2A through 2C. Throughout the description, a postfix "_UP" is used to represent the upstream port, and postfixes "_DP0," "_DP1," "DP2," "_IE0," and "_IE1" are used to represent downstream ports, 0, 1, 2 and internal endpoints 0 and 1, respectively.

FIG. 2A illustrates routing block RB_UP in the upstream port. Since each of the ports may route TLPs to/from one or more of the other ports, in each of the ports, a routing slave is created and dedicated to listening to each of the other ports that communicate TLPs with it. Further, since a port may also be used to route other TLPs (including TLPs generated within the port) that may need to exit the PCI Express switch 10 through the port, an additional optional routing slave may be added to listen to the port's own routing information bus. The creation of the additional routing slave also improves the modularity in the design of the routing blocks. Therefore, the routing block RB_UP includes six routing slaves, Slave_UP, Slave_DP0, Slave_DP1, Slave_DP2, Slave_IE0, and Slave_IE1. Routing slave Slave_UP listens to the upstream port itself. Routing slaves Slave_DP0, Slave_DP1, and Slave_DP2 listen to downstream ports 0, 1, and 2, respectively. Routing slaves Slave_IE0 and Slave_IE1 listen to internal endpoints 0 and 1, respectively. Preferably, the designs of routing slaves Slave_UP, Slave_DP0, Slave_DP1, Slave_DP2, Slave_IE0, and Slave_IE1 will be very similar to each other. In some implementations, routing slaves Slave_DP0, Slave_DP1, and Slave_DP2 may be identical. Likewise, routing slaves Slave_IE0 and Slave_IE1 may be identical.

FIG. 2B illustrates routing block RB_DP0 in downstream port 0. As discussed in the preceding paragraph, routing blocks RB_DP1 and RB_DP2 may be identical to routing block RB_DP0. Since each of the downstream ports 0 through 2 only route TLPs to/from other downstream ports or the upstream port, each of the routing blocks RB_DP0 through RB_DP2 only includes four routing slaves, namely Slave_UP, Slave_DP0, Slave_DP1, and Slave_DP2. Throughout the description, when two routing slaves in different ports are referred to by a same name, it indicates that they listen to a same routing information bus. Accordingly, routing slaves with a same name may be found in a plurality of routing blocks.

FIG. 2C illustrates routing block RB_IE0. Since the internal endpoints only route TLPs through the upstream port, each of the internal endpoints 0 and 1 only includes a routing slave Slave_UP for listening to the upstream port, and optionally routing slave Slave_IE0 or Slave_IE1 for listening to the endpoints itself.

It is realized that if the number of downstream ports and/or internal endpoints changes, the number of routing slaves in each of the ports will change accordingly, so that in each of the routing blocks, a routing slave is dedicated to each of the other ports that will communicate TLPs with the current port.

Figure 3:
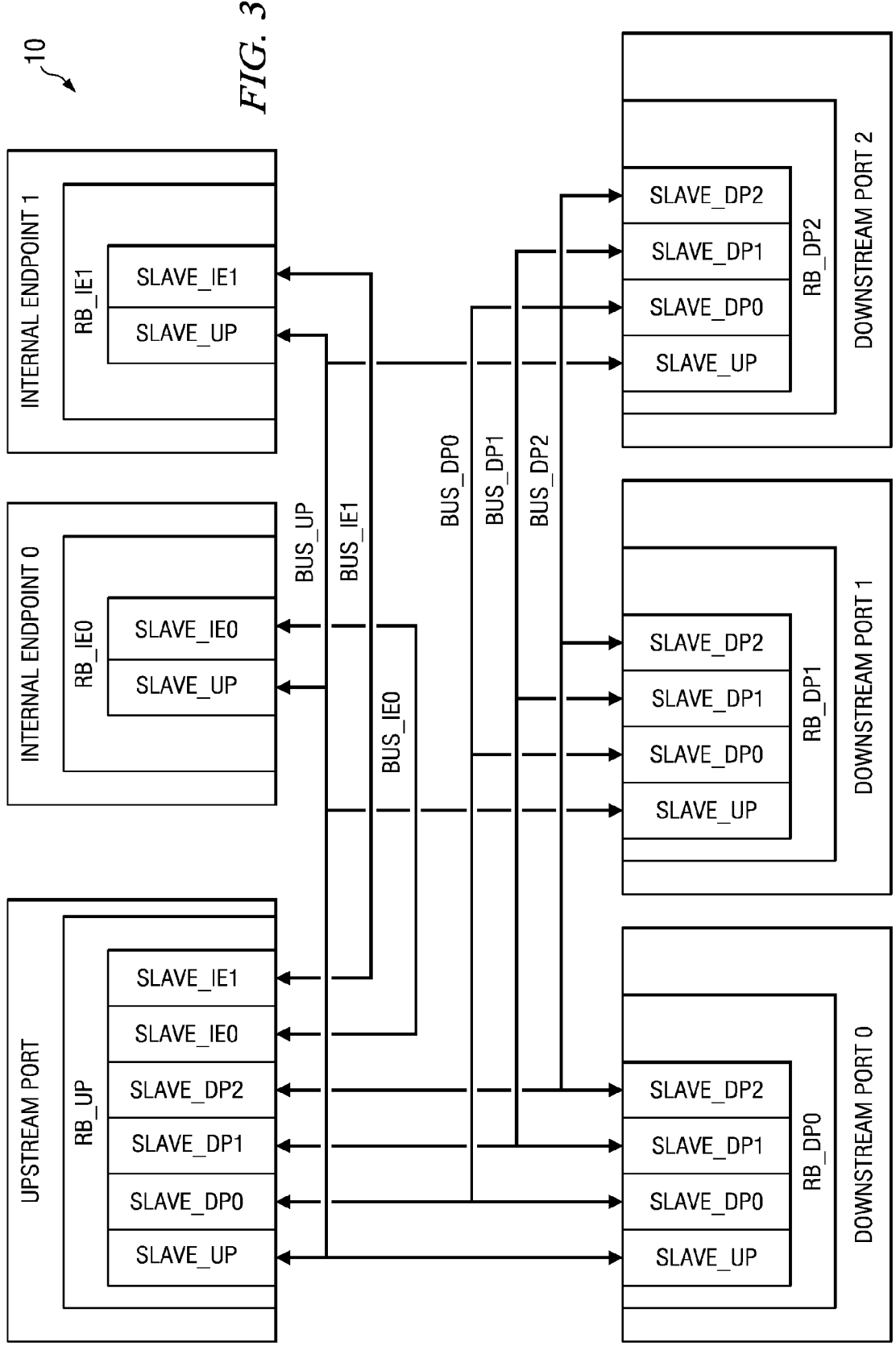
FIG. 3 illustrates a connection scheme for connecting routing information buses to the routing slaves.

FIG. 3 illustrates a connection scheme for connecting routing information buses and routing slaves of PCI Express switch 10. Since there are six ports in PCI Express switch 10, there are six routing information buses, namely, BUS_UP, BUS_DP0, BUS_DP1, BUS_DP2, BUS_IE0, and BUS_IE1, each for broadcasting the routing information extracted from the incoming TLP. Routing information bus BUS_UP is used by the upstream port for broadcasting the routing information of the TLPs received (from outside the PCI Express switch) by the upstream port. Each of the downstream ports 0 through 2 and internal endpoints 1 and 2 has a routing slave Slave_UP dedicated to listening to the routing information carried on routing information bus BUS_UP, so that the downstream ports and the internal endpoints may make decisions as to how they want to act on the routing information. Similarly, routing information buses BUS_DP0, BUS_DP1, and BUS_DP2 are used for broadcasting the routing information of the TLPs received by the downstream ports 0, 1, and 2, respectively. The routing information buses BUS_IE0 and BUS_IE1 are used for transferring the routing information of the TLPs received by the internal endpoints 0 and 1, respectively. Only the routing slaves Slave_IE0 and Slave_IE1 in the upstream port need to listen to the routing information buses BUS_IE0 and BUS_IE1, respectively. As discussed in preceding paragraphs, for making the routing blocks more modular, a routing slave may optionally be created in each of the routing blocks for listening to the routing information bus of the port (resident port) that the optional routing slave resides in.

The embodiments of the present application use distributed routing schemes, in which each of the ports makes routing decisions and assertions, for example, whether to claim a TLP for routing, whether to assert a TLP as malformed, and/or whether to assert a TLP as unsupported, by themselves. Accordingly, the individual routing decisions and assertions made by the potential egress ports may conflict with each other. For example, two potential egress ports may both determine to route a TLP out of PCI Express switch 10 through them, and may both claim the same TLP. In an embodiment, the integrity of PCI Express switch 10 is maintained using daisy chains, as illustrated in FIGS. 4A, 4B, and 4C.

Figure 4A:
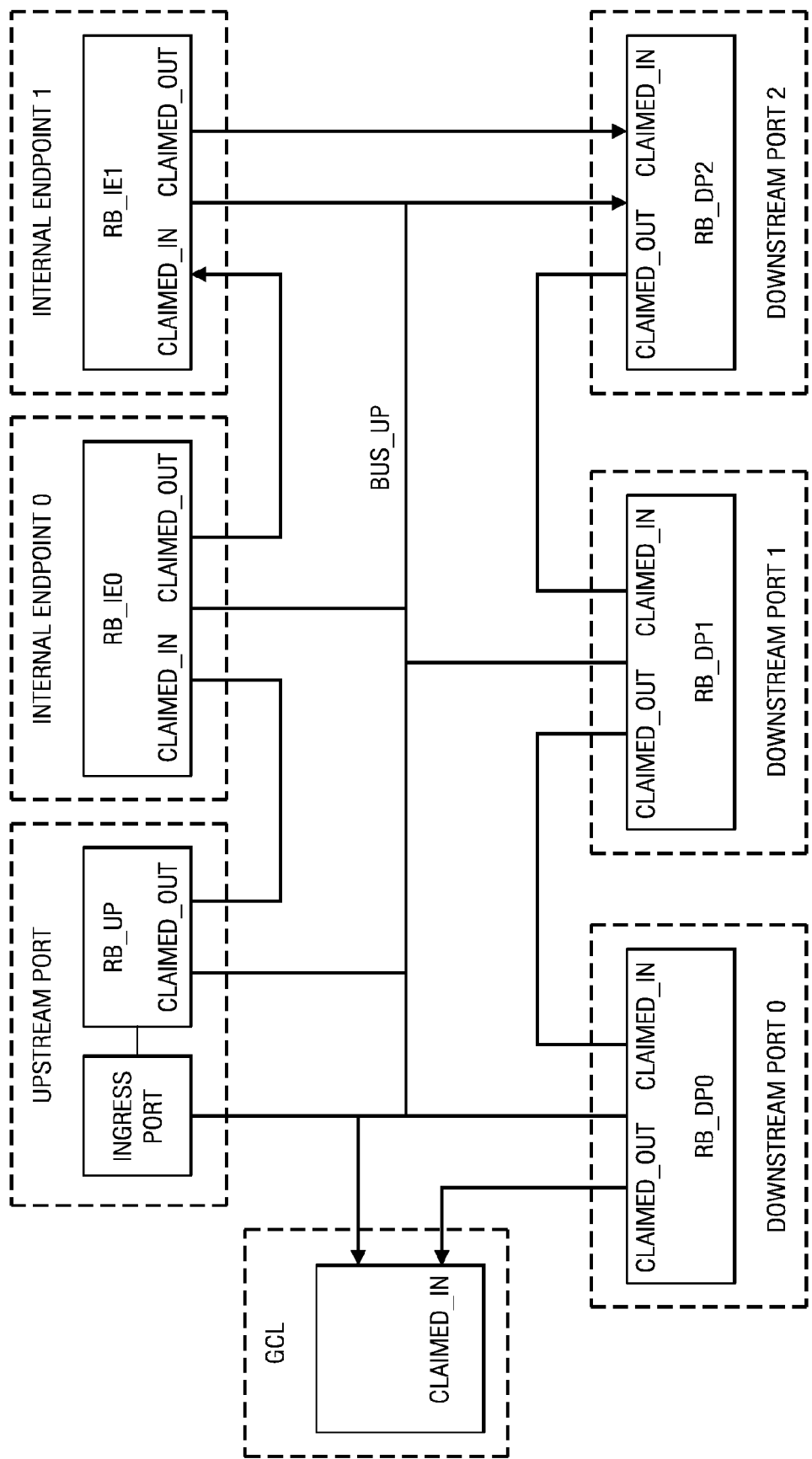
FIGS. 4A, 4B, and 4C illustrate a "Claimed" daisy chain, a "Malformed" daisy chain, and a "Unsupported" daisy chain, respectively.
Figure 4B:
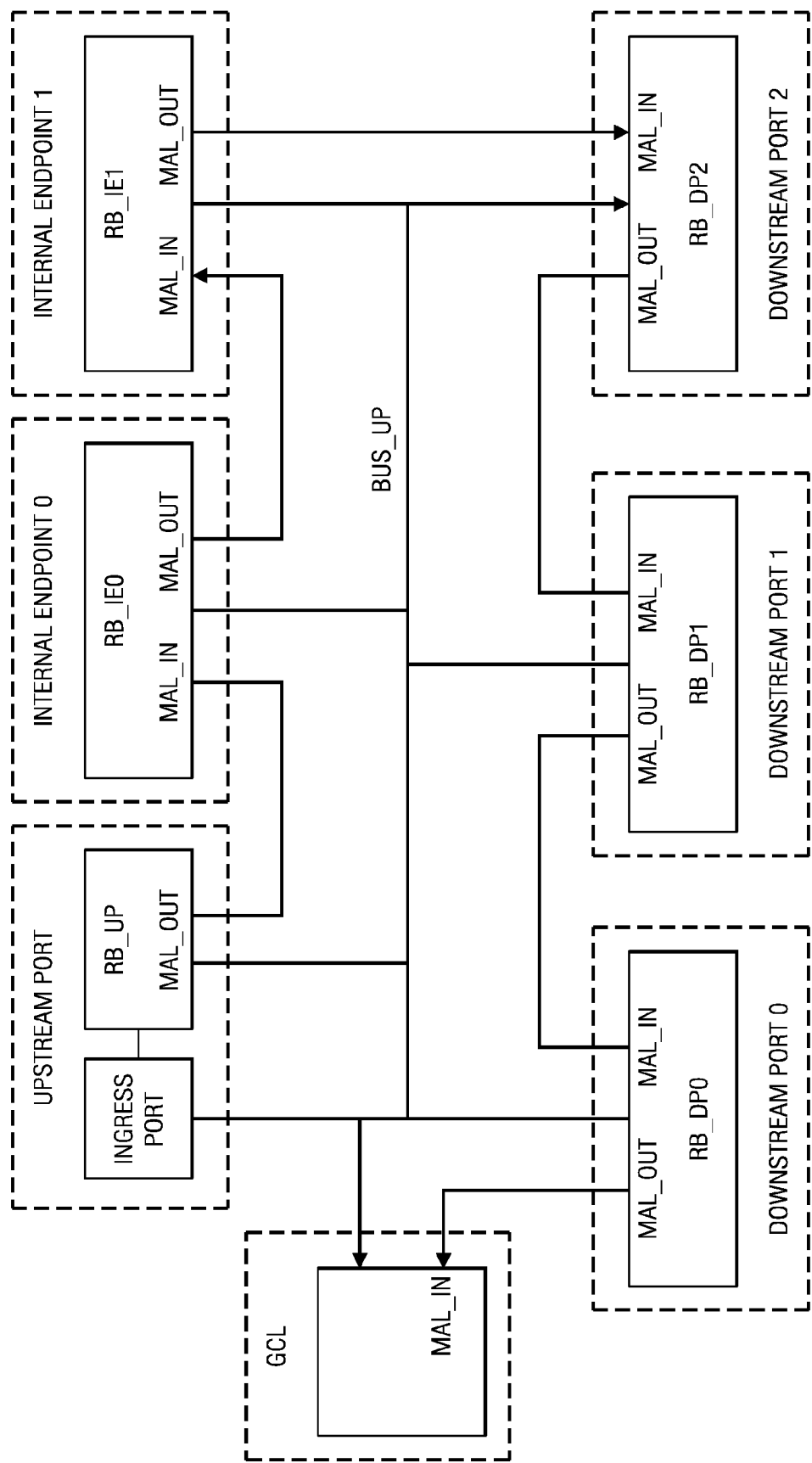
Figure 4C:
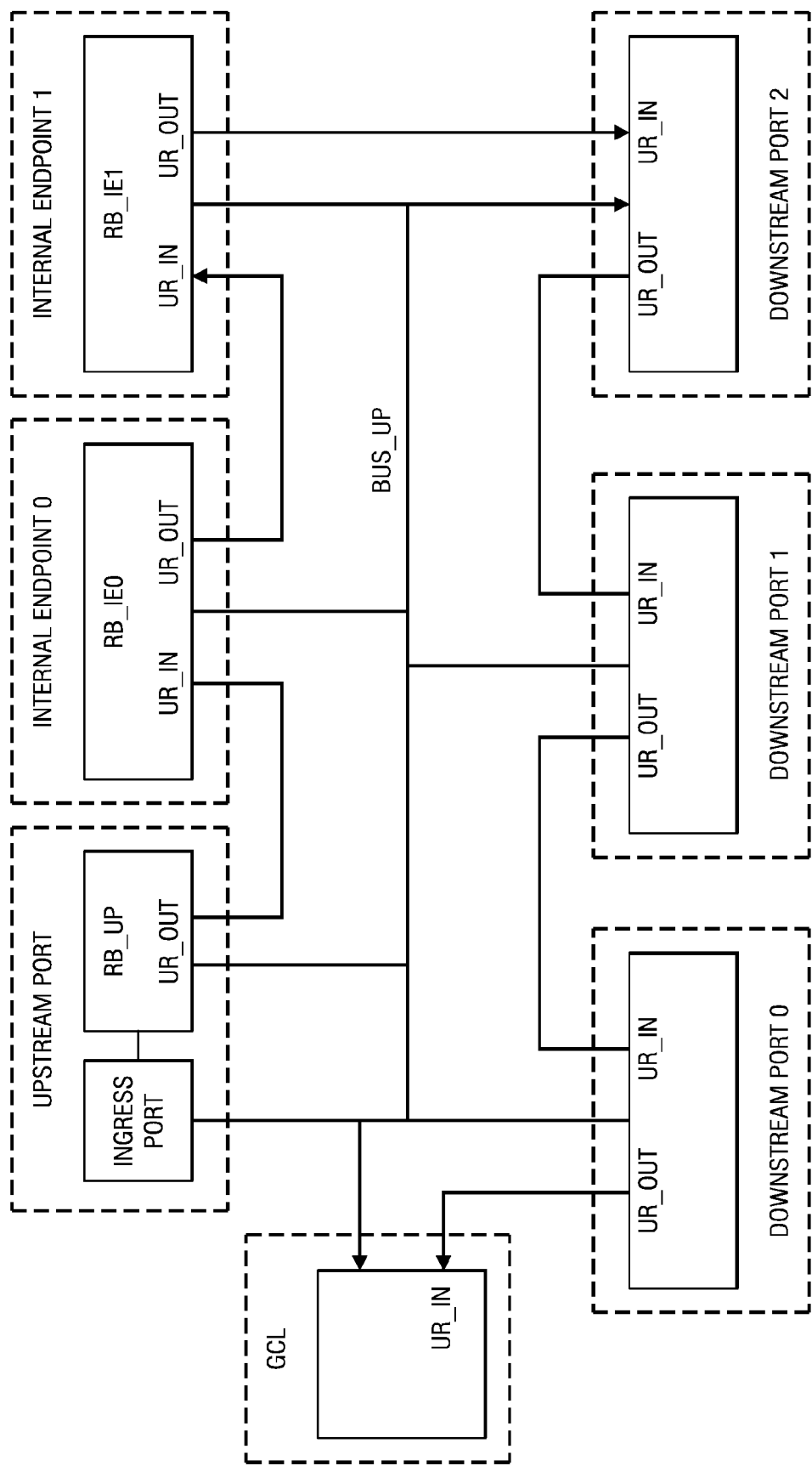

FIG. 4A illustrates a daisy chain for integrating the assertions for "claiming" TLPs, which daisy chain is referred to hereinafter as "Claimed" daisy chain. When a TLP enters an ingress port, for example, the upstream port as shown in FIG. 4A, the ingress port extracts the routing information of the TLP and broadcast the routing information on the respective routing information bus, for example, BUS_UP in this example. The "Claimed" daisy chain is formed by connecting the routing blocks into a chain. The order of a port/routing block in the daisy chain determines its priority in the processing of the TLPs. In the exemplary embodiment shown in FIG. 4A, the ports are arranged in the order of: internal end point 0, internal endpoint 1, downstream port 2, downstream port 1, and downstream port 0, with the ports in the up-stream of the daisy chain having higher priorities.

Each of the routing blocks RB_IE0, RB_IE1, RB_DP0, RB_DP1 and RB_DP2 will make a decision as whether to claim the TLP or not. The port that successfully claims the packet will eventually be the egress port of the TLP. Each of the ports will make its decision based on two pieces of information, that is, whether a port in the up-stream of the "Claimed" daisy chain has claimed the TLP or not (through a "Claimed_in" node in the routing block), and whether the port itself wants to claim the TLP or not. Since the ports in the up-stream of the "Claimed" daisy chain have higher priorities over the ports in the down-stream, they may override decisions and assertions made by ports in the down-stream of the daisy chain. Therefore, if a port (referred to as current port hereinafter) finds that a port in the up-stream of the "Claimed" daisy chain has claimed a TLP, the current port will not claim it. However, the current port will set a signal at a "Claimed_out" node to inform the ports in the down-stream of the "Claimed" daisy chain that the TLP has been claimed. If none of the ports in the up-stream of the "Claimed" daisy chain have claimed the TLP, the current port may make the decision as whether to claim it or not, for example, based on the address of the TLP, the type of the TLP, and/or the target bus number of the TLP. If the current port decides to claim the TLP, it will set a signal at the "Claimed_out" node to inform the ports down-stream from it on the "Claimed" daisy chain that the TLP has been claimed. If, however, the current port decides not to claim the TLP, the ports in the down-stream may still claim it. The "Claimed" daisy chain ensures that at most one port may claim a TLP, and thus the TLP will only exit out of only one egress port. A Global Control logic (GCL) unit or any other final logic block may be used at the end of the daisy chain to collect the "Claimed" information. This final logic block will have the responsibility of handling all unclaimed TLPs as unsupported requests. This is needed because TLPs need to be claimed by a port to exit the PCI Express switch 10. If no port claims a TLP, the TLP is deemed unsupported (by any of the ports).

If a TLP is claimed by a port in the up-stream of the "Claimed" daisy chain, the information is rippled through the down-stream of the daisy chain, preferably in one clock cycle. Further, the entire process for propagating and coordinating which of the ports will claim the TLP is finished in one clock cycle, which yields maximum performance advantage.

In the embodiments of the present application, PCI Express switch 10 may include two other types of daisy chains, "Malformed" daisy chains, and "Unsupported" daisy chains. FIG. 4B illustrates a "Malformed" daisy chain for the upstream port, which daisy chain has a similar structure as the "Claimed" daisy chain. If one of the routing blocks in the "Malformed" daisy chain asserts the TLP as being malformed, the "Malformed" information is rippled through the "Malformed" daisy chain using "Mal_In" and "Mal_Out" nodes, and the respective TLP is put in a "Malformed" bucket for further processing. As a result, no routing of the TLP will be performed. Again, an internal logic unit GCL may be used to collect the "Malformed" information. Preferably, the "Malformed" status of the TLP is propagated and coordinated in one clock cycle.

FIG. 4C illustrates an exemplary "Unsupported" daisy chain for the upstream port. In one embodiment, if none of the routing blocks assert that the respective TLP is supported, it may be determined by the GCL unit as being "Unsupported," and the respective TLP is put into an "Unsupported" bucket for further processing by internal logics. In other embodiments, one routing block may proactively assert the TLP as unsupported. In this case, the "Unsupported" assertion is rippled through the "Unsupported" daisy chain, and received by the GCL unit. Again, the "Unsupported" status of the TLP may be propagated and coordinated in one clock cycle.

Using the exemplary daisy chains shown in FIGS. 4A, 4B, and 4C, the decisions and assertions as whether the respective TLP is claimed, malformed, or unsupported may all be propagated and coordinated in clock cycle. As discussed in the preceding paragraphs, if the TLP is claimed, it is also determined in the same clock cycle which of the ports has the right to claim it. The upstream port, which is the ingress port in this example, will forward the TLP to the egress port, which has claimed the TLP.

In FIGS. 4A, 4B, and 4C, the "Claimed," "Malformed," and "Unsupported" daisy chains are used for the routing information bus BUS_UP, which is for broadcasting routing information of TLPs incoming from the upstream port.

Downstream ports 0, 1, and 2 require routing information buses BUS_DP0, BUS_DP1, and BUS_DP2, respectively. Similarly, each of the routing information buses BUS_DP0, BUS_DP1, and BUS_DP2 requires a "Claimed" daisy chain, a "Malformed" daisy chain, and an "Unsupported" daisy chain. The daisy chains for the downstream ports 0 through 2 are essentially the same as the daisy chains of the upstream port, except that the respective ingress downstream ports are the beginning point of the respective daisy chains. The internal endpoints 0 and 1 do not need daisy chains, since only the upstream port will route packets to/from the internal endpoints.

The embodiments of the present application have several advantageous features. Each of the above-discussed routing slaves, regardless in which port they are located, may be identical to each other, and thus one intellectual property (IP) of a routing slave may be simply copied into the design of other ports. Advantageously, when a new PCI Express switch product is to be designed, the existing routing slave design may be reused. Further, the routing blocks may be re-designed by simply adding/deleting routing slaves if the new PCI Express switch product has a different number of ports over existing PCI Express switch products. The routing logic of the routing blocks, however, does not have to be changed significantly.

In addition, by using the distributed routing scheme of the embodiments of the present application, the routing of incoming data packets can be processed in parallel, and non-blocking routing may be achieved even if the packets are received simultaneously. Additional advantageous features of the embodiments of the present application include quick turn-around of the routing information, and hence improved performance, and robust conflict resolution and error handling by using daisy chains.

Although the embodiments and their advantages have been described in detail, it should be understood that various changes, substitutions and alterations can be made herein without departing from the spirit and scope of the present application as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present application, processes, machines, manufacture, compositions of matter, means, methods, or steps, presently existing or later to be developed, that perform substantially the same function or achieve substantially the same result as the corresponding embodiments described herein may be utilized according to the present application. Accordingly, the appended claims are intended to include within their scope such processes, machines, manufacture, compositions of matter, means, methods, or steps.

What is claimed is:

1. A Peripheral Component Interconnect (PCI) Express device for routing and determining disposition of transactions comprising:
    a first, a second, and a third port;
    a first routing information bus connected to the first port;
    a second routing information bus distinct from the first bus and connected to the second port;
    a third routing information bus distinct from the first and second buses and connected to the third port;
    two routing slaves in the first port, each dedicated to listening to one of the second and the third routing information buses;
    two routing slaves in the second port, each dedicated to listening to one of the first and the third routing information buses; and
    two routing slaves in the third port, each dedicated to listening to one of the first and the second routing information buses.

2. The PCI Express device of claim 1 further comprising a daisy chain connecting the first, the second, and the third ports, wherein the daisy chain is configured to propagate and coordinate routing decisions made by potential egress ports among the first, the second, and the third ports.

3. The PCI Express device of claim 2 further comprising two additional daisy chains, wherein each of the daisy chain and the additional daisy chains is dedicated for propagating and coordinating routing decisions in response to routing information received from one of the first, the second, and the third routing information buses.

4. The PCI Express device of claim 3, wherein the daisy chain and the additional daisy chains are "Claimed" daisy chains for connecting routing blocks into a chain, and wherein the PCI Express switch further comprises:
    three "Malformed" daisy chains, each dedicated for propagating and coordinating "Malformed" assertions as defined by PCI Express base specification 2.1 in response to the routing information received from one of the first, the second and the third routing information buses; and
    three "Unsupported" daisy chains, each dedicated for propagating and coordinating "Unsupported" assertions as defined by PCI Express base specification 2.1 in response to the routing information received from one of the first, the second and the third routing information buses.

5. The PCI Express device of claim 1 further comprising:
    a plurality of additional ports;
    a plurality of additional routing information buses, each being connected to one of the plurality of additional ports; and
    a plurality of additional routing slaves in each of the first, the second, and the third ports, wherein each of the plurality of additional routing slaves is dedicated for listening to one of the plurality of additional routing information buses.

6. The PCI Express device of claim 1, wherein the first, the second, and the third ports comprise an upstream port and two downstream ports, and wherein the PCI Express device is a switch further comprising:
    an internal endpoint;
    an additional routing information bus connected to the internal endpoint; and
    a dedicated routing slave in the upstream port configured to listen to the additional routing information bus, wherein the two downstream ports are free from routing slaves for listening to the additional routing information bus, and wherein the internal endpoint is free from routing slaves for listening to routing information buses connected to the downstream ports.

7. The PCI Express device of claim 1, wherein each of the first, the second, and the third ports further comprises a routing slave configured to listen to the first, the second, and the third routing information buses, respectively.

8. A Peripheral Component Interconnect (PCI) Express device comprising:
    an upstream port;
    a plurality of downstream ports;
    a plurality of routing blocks, each in one of the upstream port and the plurality of downstream ports;

a plurality of routing information buses, each connected to one of the upstream port and the plurality of downstream ports;

a plurality of routing slaves in each of the plurality of the routing blocks, wherein each of the plurality of routing information buses is connected to a routing slave in each of the routing blocks;

a plurality of "Claimed" daisy chains for connecting routing blocks into a chain, each dedicated for propagating and coordinating "Claimed" assertions in response to a routing information received from one of the plurality of routing information buses;

a plurality of "Malformed" daisy chains, each dedicated for propagating and coordinating "Malformed" assertions as defined by PCI Express base specification 2.1 in response to the routing information received from one of the plurality of routing information buses; and a plurality of "Unsupported" daisy chains, each dedicated for propagating and coordinating "Unsupported" assertions as defined by PCI Express base specification 2.1 in response to the routing information received from one of the plurality of routing information buses.

9. The PCI Express device of claim 8 further comprising:
an internal endpoint;
an additional routing information bus connected to the internal endpoint;
a dedicated routing slave in the upstream port configured to listen to the additional routing information bus; and
a dedicated routing slave in the internal endpoint configured to listen to a routing information bus connected to the upstream port.

10. The PCI Express device of claim 9, wherein the internal endpoint is free from routing slaves dedicated for listening to the routing information buses connected to the plurality of downstream ports.

11. The PCI Express device of claim 9, wherein the routing blocks in the plurality of downstream ports are free from routing slaves configured to listen to the additional routing information bus.

12. The PCI Express device of claim 8, wherein the plurality of routing information buses are electrically separated from each other.

13. The PCI Express device of claim 8, wherein each of the first, the second, and the third plurality of daisy chains connects all of the plurality of routing blocks.

14. A method for operating a PCI Express device, the method comprising:
providing a first, a second, and a third port;
providing a first daisy chain connecting the first, the second, and the third ports;
providing a first, a second, and a third routing information bus connecting to, and dedicated to, the first, the second, and the third ports, respectively;
providing a first, a second, and a third routing slave in the first, the second, and the third ports, respectively, wherein the second and the third routing slaves are dedicated to listening to the first routing information bus;
receiving a first data packet into the first port;
extracting a first routing information from the first data packet;
broadcasting the first routing information on the first routing information bus;

receiving the first routing information into the second and the third routing slaves; and
making first routing assertions regarding the first data packet by the second and the third ports, wherein the first routing assertions are propagated and coordinated through the first daisy chain.

15. The method of claim 14 further comprising:
providing a second daisy chain connecting the first, the second, and the third ports;
providing a fourth routing slave in the third port, wherein the first and the fourth routing slaves are dedicated to listening to the second routing information bus;
receiving a second data packet into the second port;
extracting a second routing information from the second data packet;
broadcasting the second routing information on the second routing information bus;
receiving the second routing information into the first and the fourth routing slaves; and
making second routing assertions by the first and the third ports, wherein the second routing assertions are propagated and coordinated through the second daisy chain.

16. The method of claim 15 further comprising providing a third daisy chain connecting the first, the second, and the third ports, wherein the third daisy chain is dedicated to propagating and coordinating additional routing assertions in response to additional routing information on the third routing information bus.

17. The method of claim 16, wherein the first, the second, and the third daisy chains are "Claimed" daisy chains for connecting routing blocks into a chain dedicated for one of the first, the second, and the third routing information buses, respectively, and wherein the method further comprises providing a "Malformed" and a "Unsupported" daisy chain as defined by PCI Express base specification 2.1 for each of the first, the second, and the third routing information buses.

18. The method of claim 14 further comprising:
providing a plurality of additional ports;
connecting a plurality of additional routing information buses with each being connected to one of the plurality of additional ports; and
providing a plurality of additional routing slaves in each of the first, the second, and the third ports, wherein each of the plurality of additional routing slaves is dedicated for listening to one of the plurality of additional routing information buses.

19. The method of claim 14, wherein the first, the second, and the third ports comprise an upstream port and two downstream ports, and wherein the method further comprises:
providing an internal endpoint;
connecting an additional routing information bus to the internal endpoint;
providing a dedicated routing slave in the upstream port dedicated for listening to the additional routing information bus; and
providing a dedicated routing slave in the internal endpoint dedicated for listening to a routing information bus connected to the upstream port.

20. The method of claim 19, wherein the routing blocks in the downstream ports are free from routing slaves for listening to the additional routing information bus.

* * * * *